United States Patent
Soquet (10) Patent No.: US 9,934,141 B1
(45) Date of Patent: Apr. 3, 2018

(54) SYSTEM AND METHOD FOR EFFICIENTLY MANAGING A CONTAINMENT HIERARCHY

(71) Applicant: Marvell International Ltd., Hamilton (BM)

(72) Inventor: Patrick Soquet, Chastre (BE)

(73) Assignee: MARVELL INTERNATIONAL LTD., Hamilton (BM)

( * ) Notice: Subject to any disclaimer, the term of this patent is extended or adjusted under 35 U.S.C. 154(b) by 341 days.

(21) Appl. No.: 14/849,827

(22) Filed: Sep. 10, 2015

Related U.S. Application Data (60) Provisional application No. 62/079,346, filed on Nov. 13, 2014.

(51) Int. Cl.
  *G06F 12/02* (2006.01)
  *G06F 3/0484* (2013.01)

(52) U.S. Cl.
  CPC ........ *G06F 12/0269* (2013.01); *G06F 3/0484* (2013.01); *G06F 12/0261* (2013.01); *G06F 2212/702* (2013.01)

(58) Field of Classification Search
  CPC .................................................. G06F 12/0261
  See application file for complete search history.

(56) References Cited

U.S. PATENT DOCUMENTS

| | | | |
|---|---|---|---|
| 6,633,312 B1 * | 10/2003 | Rochford ................ | H04L 41/22 709/223 |
| 6,850,255 B2 * | 2/2005 | Muschetto ............ | G06F 3/0481 715/744 |
| 6,918,093 B2 * | 7/2005 | Broussard ............. | G06F 9/4443 715/749 |
| 2004/0139193 A1 * | 7/2004 | Refai .................. | H04L 41/0803 709/224 |

* cited by examiner

*Primary Examiner* — Kris E Mackes (57) ABSTRACT

Systems and methods are provided for generating a user interface display on a graphical user interface. Native data is accessed from memory for generating a containment hierarchy, the native data describing features of the user interface display. The containment hierarchy is generated using the accessed native data, the containment hierarchy comprising a plurality of content records, where the containment hierarchy being stored in a system heap. The user interface display is generated by iterating through the plurality of content records of the containment hierarchy. One or more references to one or more content records of the plurality of content records of the containment hierarchy are removed, where the one or more references indicate that the corresponding one or more content records are in use, such that the one or more content records can be reclaimed by garbage collection.

20 Claims, 9 Drawing Sheets

- DISPLAY
  - HEADER
  - IMAGE
  - TABLE
    - ROW 1
      - CELL 1
      - CELL 2
      - CELL 3
      - CELL 4
    - ROW 2
      - CELL 1
      - CELL 2
      - CELL 3
      - CELL 4
    - ROW 3
      - CELL 1
      - CELL 2
      - CELL 3
      - CELL 4
    - ROW 4
      - CELL 1
      - CELL 2
      - CELL 3
      - CELL 4
    - ROW 5
      - CELL 1
      - CELL 2
      - CELL 3
      - CELL 4
  .
  .
  .

EACH MAY REQUIRE MULTIPLE CONTENT OBJECTS TO DRAW, EACH CONTENT OBJECT INCLUDING MULTIPLE FIELDS (E.G., TYPE, CONTENT, IN-USE)

ONLY A FEW OF POTENTIALLY HUNDREDS OF ROWS DISPLAYED AT ONE TIME, BUT DATA FOR ALL STILL IN HEAP

FIG. 2

- DISPLAY
  - HEADER
  - IMAGE
  - TABLE
    - ROW 1
      - CELL 1
      - CELL 2
      - CELL 3
      - CELL 4
    - ROW 2
      - CELL 1
      - CELL 2
      - CELL 3
      - CELL 4
    - ROW 3
      - CELL 1
      - CELL 2
      - CELL 3
      - CELL 4
    - ROW 4
      - CELL 1
      - CELL 2
      - CELL 3
      - CELL 4
    - ROW 5
      - CELL 1
      - CELL 2
      - CELL 3
      - CELL 4
    .
    .
    .

REMOVE REFERENCES TO THESE CONTENT OBJECTS, ALLOWING THEM TO BE GARBAGE COLLECTED

IF REFERENCED AGAIN (E.G., SCROLLED TO ON SMART PHONE DISPLAY), REACCESS NATIVE DATA TO REGENERATE

SYSTEM AND METHOD FOR EFFICIENTLY MANAGING A CONTAINMENT HIERARCHY

CROSS-REFERENCE TO RELATED APPLICATIONS

This application claims priority to U.S. Provisional Application No. 62/079,346, filed Nov. 13, 2014, entitled "KPR Contents: Volatile Host Instances," the entirety of which is herein incorporated by reference.

TECHNICAL FIELD

The technology described herein relates generally to memory management and more particularly to improved system performance through targeted garbage collection.

BACKGROUND

The task of fulfilling a dynamic memory allocation request consists of locating a block of unused memory of sufficient size. Memory requests are satisfied by allocating portions of memory from a large pool of memory called the heap or free store. At any given time, some parts of the heap are in use, while some are free and available for future allocations. When available memory levels run low, system operation can be slow. For example, it can take longer to find an available amount of memory large enough to meet an application request.

Garbage collection is a form of automatic memory management. A garbage collector attempts to reclaim memory occupied by objects that are no longer in use by applications (e.g., memory that is no longer referenced by any application pointers, memory associated with data structures indicated as no longer in use). In addition to applications generally slowing down due to low memory levels, garbage collection also slows down based on a need to monitor and perform reclamations on larger numbers of objects (e.g., more memory to mark and sweep). This can further slow system operation.

A graphical user interface (GUI) of an application built using a dynamic language having runtime type checking, such as Java or JavaScript, may be made up of several layers of containers, herein referred to as a containment hierarchy. In one example, the first layer is a window used to contain an application, herein referred to as a top-level container. Subsequent levels can include graphical components (e.g., text boxes, labels, buttons), with properties of those graphical components forming even lower layers. In some instances, containment hierarchies can become quite large.

The containment hierarchy of many real-world applications contains a large number of content objects. For example, a single scrolling list of 100 cells, with each cell using five content objects to draw, requires 502 content objects. Once a containment hierarchy is created, many of these content objects are never again referenced. This large mass of seldom referenced objects can significantly slow system performance.

SUMMARY

Systems and methods are provided for generating a user interface display on a graphical user interface. Native data is accessed from memory for generating a containment hierarchy, the native data describing features of the user interface display. The containment hierarchy is generated using the accessed native data, the containment hierarchy comprising a plurality of content records, where the containment hierarchy being stored in a system heap. The user interface display is generated by iterating through the plurality of content records of the containment hierarchy. One or more references to one or more content records of the plurality of content records of the containment hierarchy are removed, where the one or more references indicate that the corresponding one or more content records are in use, such that the one or more content records can be reclaimed by garbage collection. A command is received to access a first content record of the plurality of content records of the containment hierarchy, where the first content record has been reclaimed by garbage collection. Native data from memory is accessed for regenerating the first content record that has been reclaimed by garbage collection, where the graphical user interface is updated using the regenerated content record.

As a further example, a computer-implemented system for generating a user interface display on a graphical user interface includes a processor and a computer-readable medium encoded with instructions, which when executed by the processor, causes the system to access native data from memory for generating a containment hierarchy, the native data describing features of the user interface display. The containment hierarchy is generated using the accessed native data, the containment hierarchy comprising a plurality of content records, where the containment hierarchy being stored in a system heap. The user interface display is generated by iterating through the plurality of content records of the containment hierarchy. One or more references to one or more content records of the plurality of content records of the containment hierarchy are removed, where the one or more references indicate that the corresponding one or more content records are in use, such that the one or more content records can be reclaimed by garbage collection. A command is received to access a first content record of the plurality of content records of the containment hierarchy, where the first content record has been reclaimed by garbage collection. Native data from memory is accessed for regenerating the first content record that has been reclaimed by garbage collection, where the graphical user interface is updated using the regenerated content record.

As an additional example, a computer-readable medium encoded with instructions, which when executed by a processor of a system, causes the system to perform operations for generating a user interface display on a graphical user interface. In the operations, native data is accessed from memory for generating a containment hierarchy, the native data describing features of the user interface display. The containment hierarchy is generated using the accessed native data, the containment hierarchy comprising a plurality of content records, where the containment hierarchy being stored in a system heap. The user interface display is generated by iterating through the plurality of content records of the containment hierarchy. One or more references to one or more content records of the plurality of content records of the containment hierarchy are removed, where the one or more references indicate that the corresponding one or more content records are in use, such that the one or more content records can be reclaimed by garbage collection. A command is received to access a first content record of the plurality of content records of the containment hierarchy, where the first content record has been reclaimed by garbage collection. Native data from memory is accessed for regenerating the first content record that has been reclaimed by garbage collection, where the graphical user interface is updated using the regenerated content record.

DETAILED DESCRIPTION

Systems and methods as described herein, in one embodiment, improve memory management, such as management of containment hierarchies for generating graphical user interfaces, by facilitating removal of seldom referenced content objects from the heap. Such operations free memory and speed up garbage collection by reducing the number and size of objects in the heap.

Figure 1:
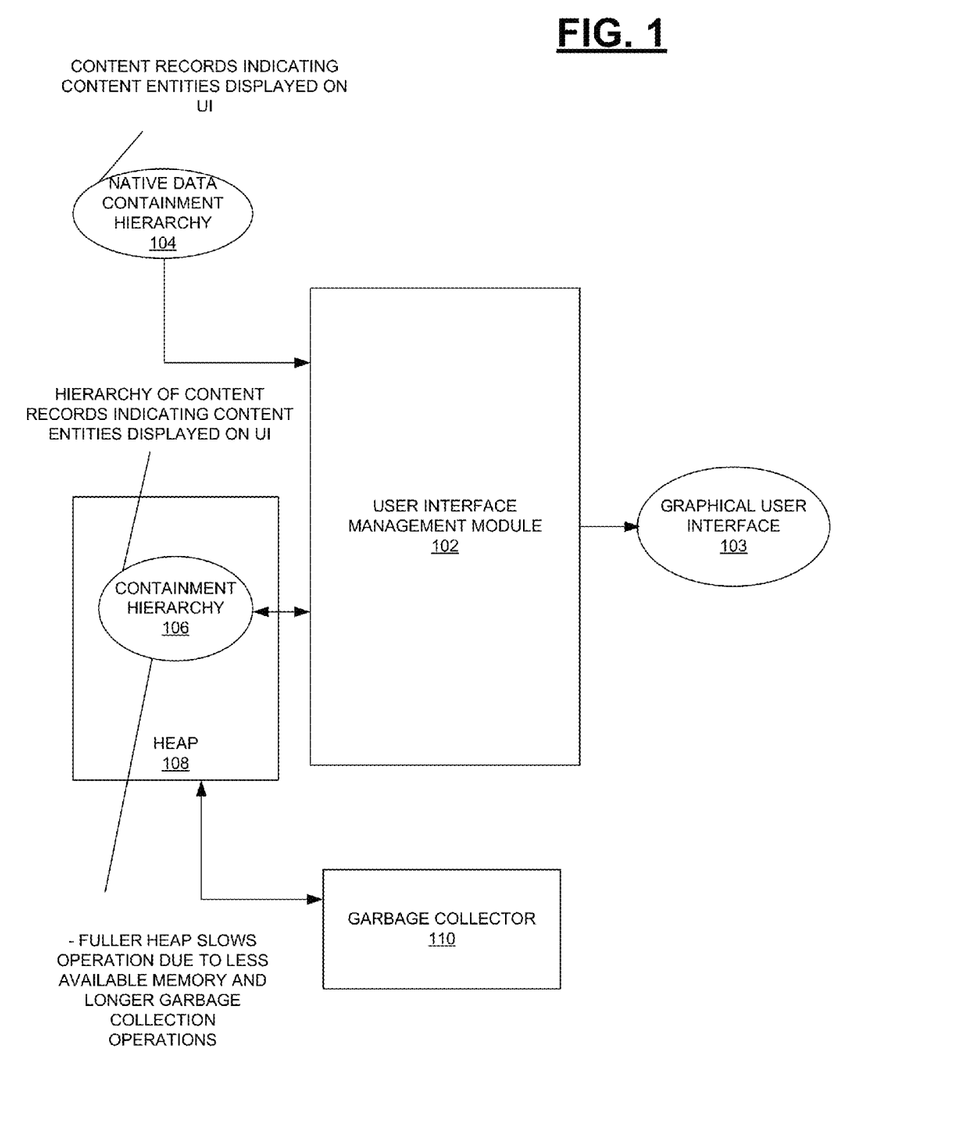
FIG. 1 is a diagram depicting a user interface management module.

FIG. 1 is a diagram depicting a user interface management module 102. FIG. 1 discloses a runtime environment for delivering applications in a variety of hardware and software platforms. The implementation of the platform in this example is in C, with the programming interface to the platform being in JavaScript. The platform provides constructors to create content objects like controls, lists or media; and functions to organize the content objects into the containment hierarchy that describes the structure of the application's user interface 103. In the native C platform, the containment hierarchy is a tree of typed content records, indicated at 104.

JavaScript applications that modify the graphical user interface 103 also maintain a containment hierarchy 106 of untyped content records indicating content entities displayed on the user interface 103. Such JavaScript objects that reference C records are sometimes referred to as host instances. The containment hierarchy 106 is stored in memory as part of the heap 108. In one embodiment, the content records of the heap containment hierarchy 106 are sealed such that applications cannot add or delete properties of those content objects. The untyped data records of the heap containment hierarchy 106 typically include additional metadata, such as a type indicator and an in-use indicator, making the host instance containment hierarchy 106 tend to be larger than the native data containment hierarchy 104. The user interface management module 102 populates the host instance containment hierarchy 106 when the user interface 103 is being initially built.

As noted above, a garbage collector 110 helps with heap 108 management. The garbage collector 110 examines objects contained in the heap 108 and references to objects in the heap 108. The garbage collector 110 periodically traverses the objects in the heap 108 marking unused objects in a marking operation, and then making the memory associated with those marked objects available for reuse in a sweep operation. The time necessary for a garbage collection cycle is dependent on the number of objects currently stored in the heap 108. Large numbers of objects in the heap can slow the garbage collection cycles and the overall system performance.

The user interface management module 102 increases memory available in the heap 108 and reduces the number of objects stored in the heap 108 to increase system performance and reduce garbage collection overhead by allowing certain JavaScript content objects in the containment hierarchy 106 to be garbage collected from the heap 108 but still persist as C content records in the native data containment hierarchy 104. Such objects are further referred to herein as volatile host instances. The user interface management module 102 makes certain content objects of the heap 108 containment hierarchy 106 available for garbage collection by removing (or not creating) references (e.g., pointers) to those content objects or by flagging those content objects as not in use. Those objects are then garbage collected, removed from the heap, freeing memory in the heap.

If volatile host instances that were garbage collected from the heap 108 containment hierarchy are later accessed, the volatile host instances are recreated from the native records 104. Such a mechanism provides the advantages of reducing the memory footprint of the JavaScript containment hierarchy 106 and enhancing the performance of the runtime environment, advantages that are especially significant on platforms with constrained resources like consumer devices.

Figure 2:
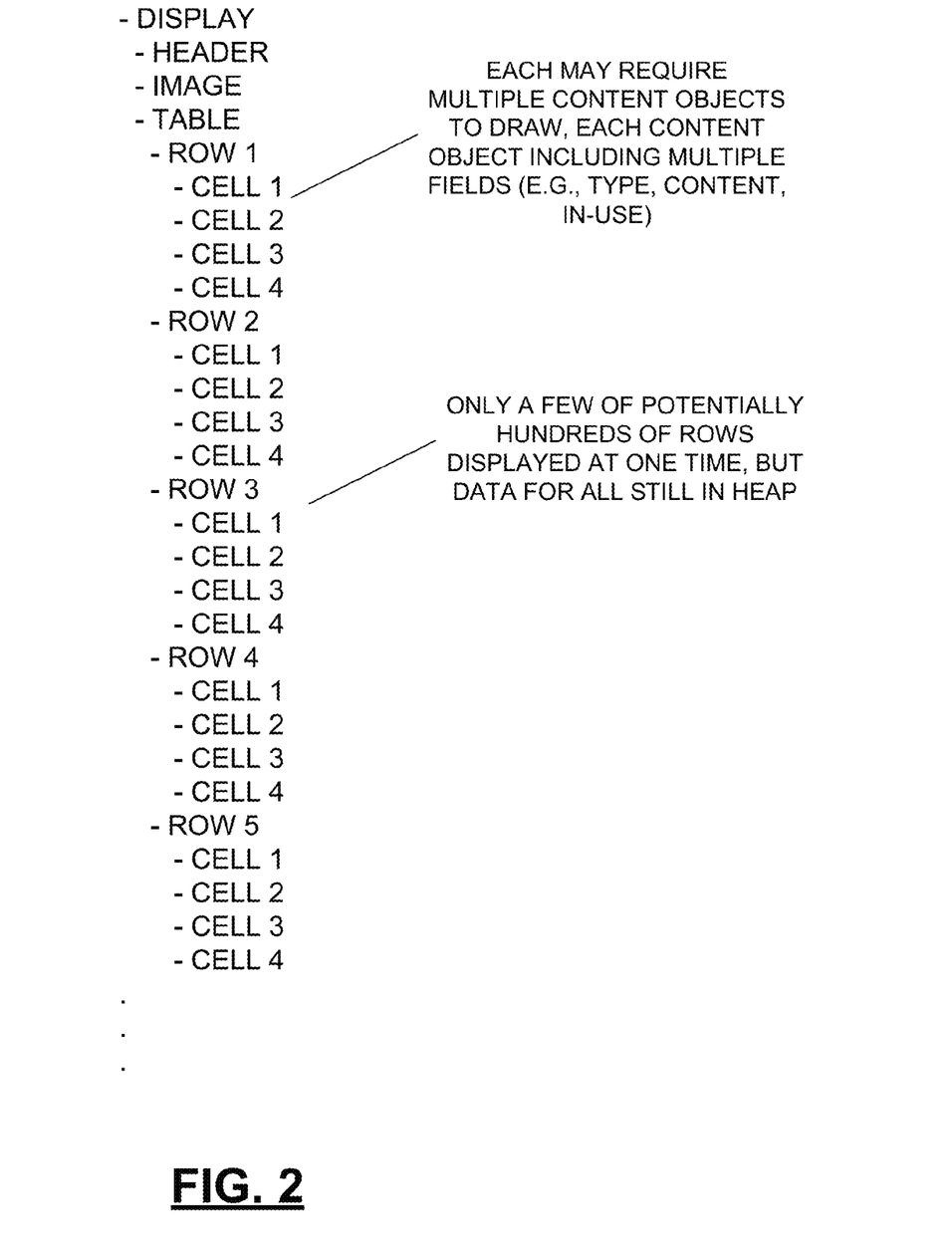
FIG. 2 is a diagram depicting an example containment hierarchy, stored in a memory heap.

FIG. 2 is a diagram depicting an example containment hierarchy, stored in a memory heap. A top level corresponds to an entire display associated with an application. A first content object beneath the display object corresponds to a displayed header, and a second content object corresponds to an image. A next content object at the second level corresponds with a table that contains a number of rows. The third layer of the hierarchy includes content object entries for each row, while a fourth layer contains content objects associated with cells in each rows. Further levels could include properties associated with content to be displayed in those individual cells. Such a containment hierarchy for a graphical user interface can quickly get very large. Because of the limited amount of graphical user interface space available for displaying content, many of the content objects in the containment hierarchy may not be on-screen at a particular time. Thus, their importance at the particular time is often diminished. A user interface management module, as described with respect to FIG. 1 can take advantage of this by making certain of the content objects of the containment hierarchy available for garbage collection.

Figure 3:
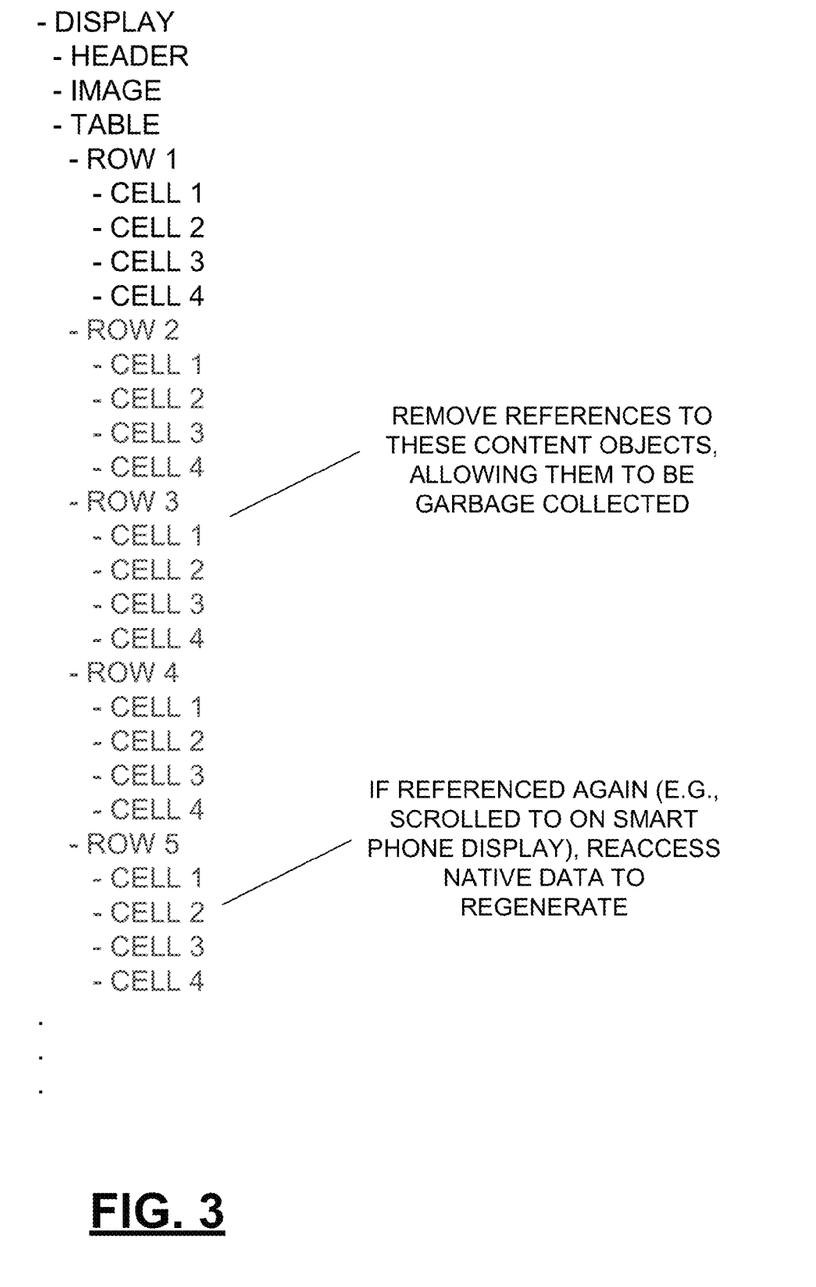
FIG. 3 is a diagram depicting a subsequent state of the containment hierarchy.

FIG. 3 is a diagram depicting a subsequent state of the containment hierarchy. To reduce current memory usage and the number of objects residing in the heap, the user interface management module has removed references to the content objects associated with rows 2-5 in the containment hierarchy (or otherwise marked them inactive or unused). On a subsequent pass, the garbage collector reclaims the memory space occupied by those content objects, removing them from the heap. If one or more of those content objects is referenced again, such as if a user scrolls to those rows, requiring rebuilding of the graphic user interface, then those content objects are rebuilt in the containment hierarchy by reference to the native containment hierarchy. Because the likelihood of those content objects being re-referenced in the immediate future is small, compared with the savings and performance improvements from a less full heap, the trade off is usually beneficial.

Figure 4:
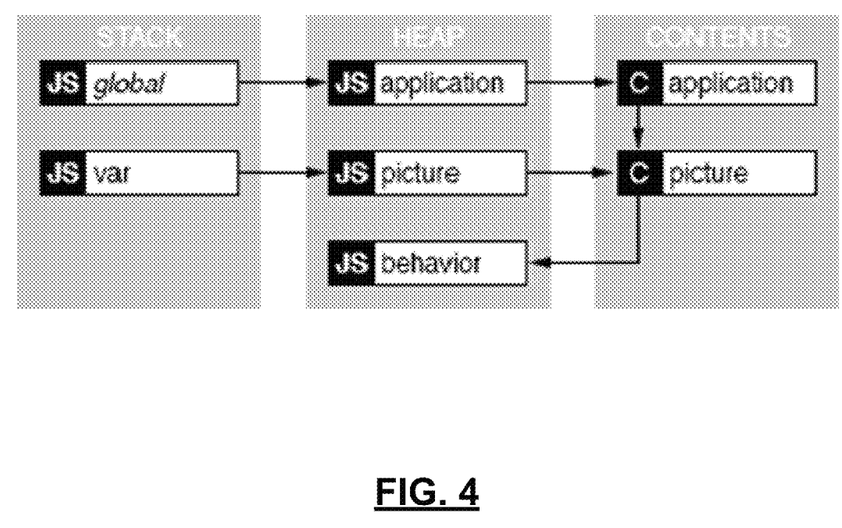
FIG. 4 is a diagram depicting a system state after a build operation.
Figure 5:
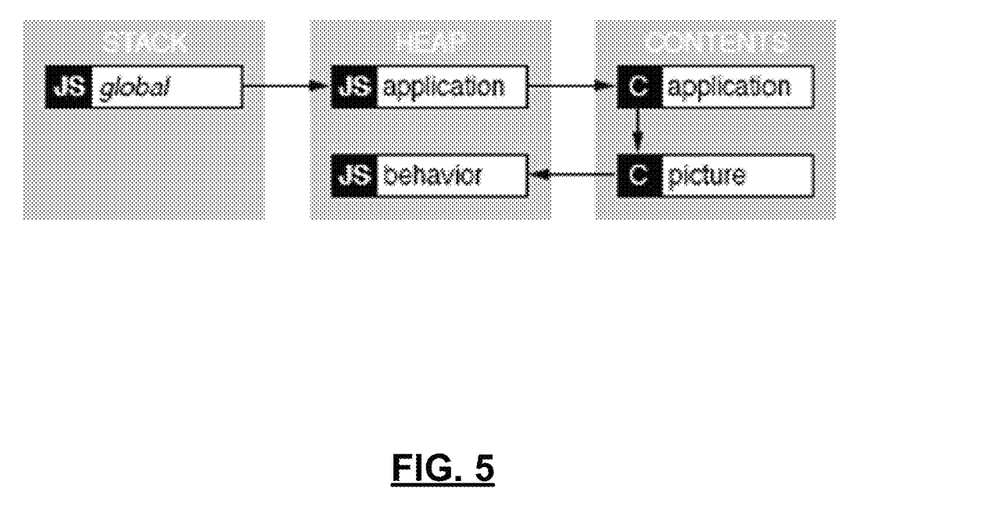
FIG. 5 is a diagram depicting a system state following garbage collection of the picture object.
Figure 6:
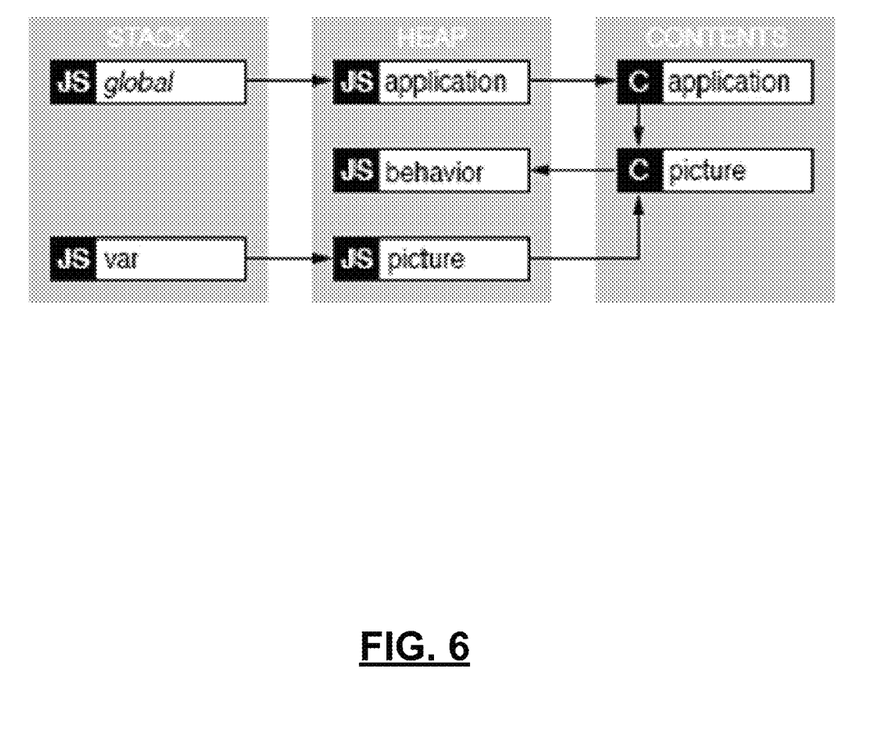
FIG. 6 is a diagram depicting a system state following recreation of the picture object.

FIGS. 4-6 depict an example that illustrates processing of a user interface management module, in one embodiment. In the example, a function is defined that creates a picture object, assigns a behavior object to the picture object, and adds the picture object to the global application object:

function build( ) {
        var picture=new Picture({ url: "image.jpg" });
        picture.behavior=new Behavior( );
        application.add(picture);
    }

FIG. 4 is a diagram depicting a system state after a build operation. Notice that following the build operation as depicted in FIG. 4, there are no global references to the picture object. After the build function returns, the picture object can be garbage collected:

build( );
    application.purge( ); // collect garbage However, the corresponding picture record remains in the containment hierarchy. The user interface management module collaborates with the dynamic language garbage collector to prevent the behavior object to be garbage-collected.

FIG. 5 is a diagram depicting a system state following garbage collection of the picture object. If or when the garbage collected picture object is again referenced, the system recreates the picture object from the picture record stored in the native containment hierarchy:

var picture=application.first;

FIG. 6 is a diagram depicting a system state following recreation of the picture object.

Figure 7:
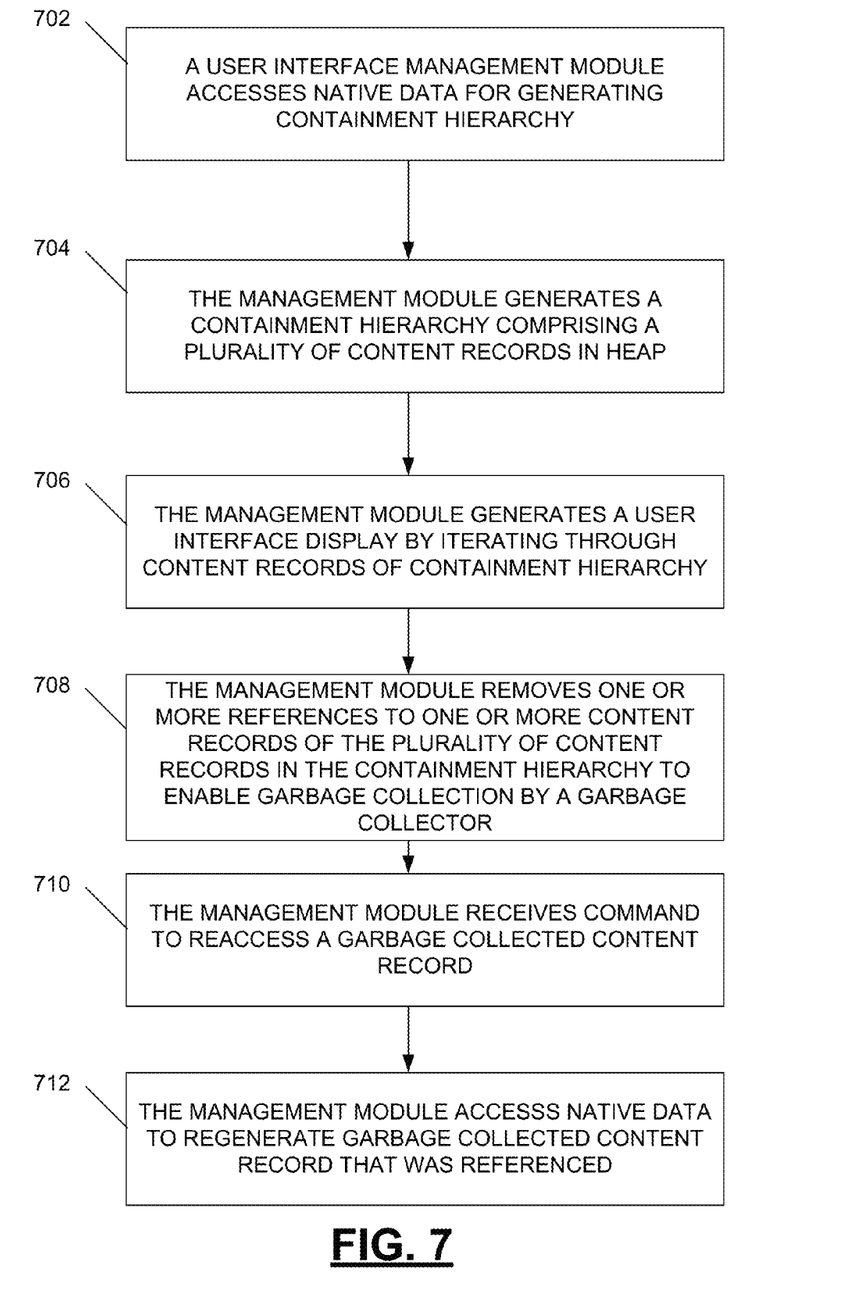
FIG. 7 is a flow diagram depicting a computer-implemented method of generating a user interface display on a graphical user interface.

FIG. 7 is a flow diagram depicting a computer-implemented method of generating a user interface display on a graphical user interface, according to one embodiment. At 702, the user interface management module 102 accesses native data 104 from memory for generating a containment hierarchy 106, the native data 104 describing features of the user interface display. At 704, the management module 102 generates the containment hierarchy 106 using the accessed native data 104, the containment hierarchy 106 comprising a plurality of content records, the containment hierarchy 106 being stored in a system heap 108. At 706, the management module 102 generates a user interface display by iterating through a plurality of content records of the containment hierarchy 106. At 708, the management module 102 removes one or more references to one or more content records of the plurality of content records of the containment hierarchy 106, where the one or more references indicate that the corresponding one or more content records are in use, such that the one or more content records can be reclaimed by garbage collector 110. At 710, the management module 102 receives a command to access a particular one of the content records of the containment record that had been garbage collected. At 712, the management module 102 accesses native data 104 from memory for regenerating the garbage collected content records, where the graphical user interface is updated using the regenerated content record.

Figure 8A:
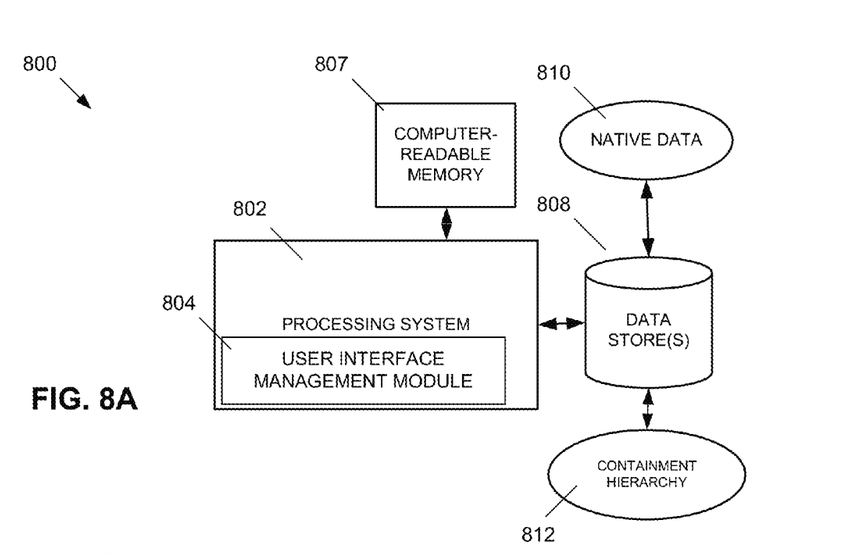
FIGS. 8A, 8B, and 8C depict example systems for implementing the approaches described herein for generating a user interface display on a graphical user interface.
Figure 8B:
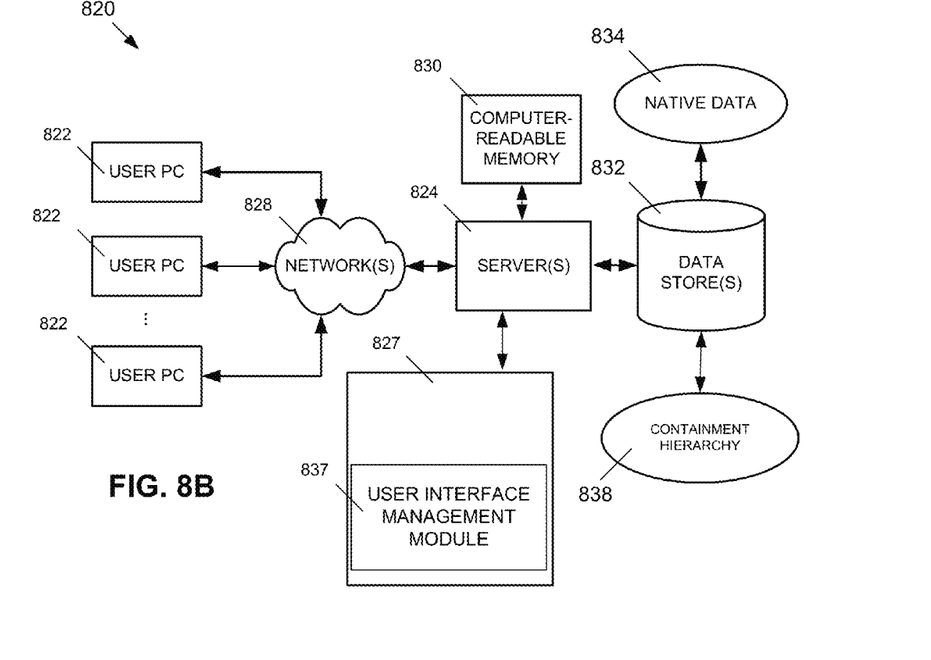
Figure 8C:
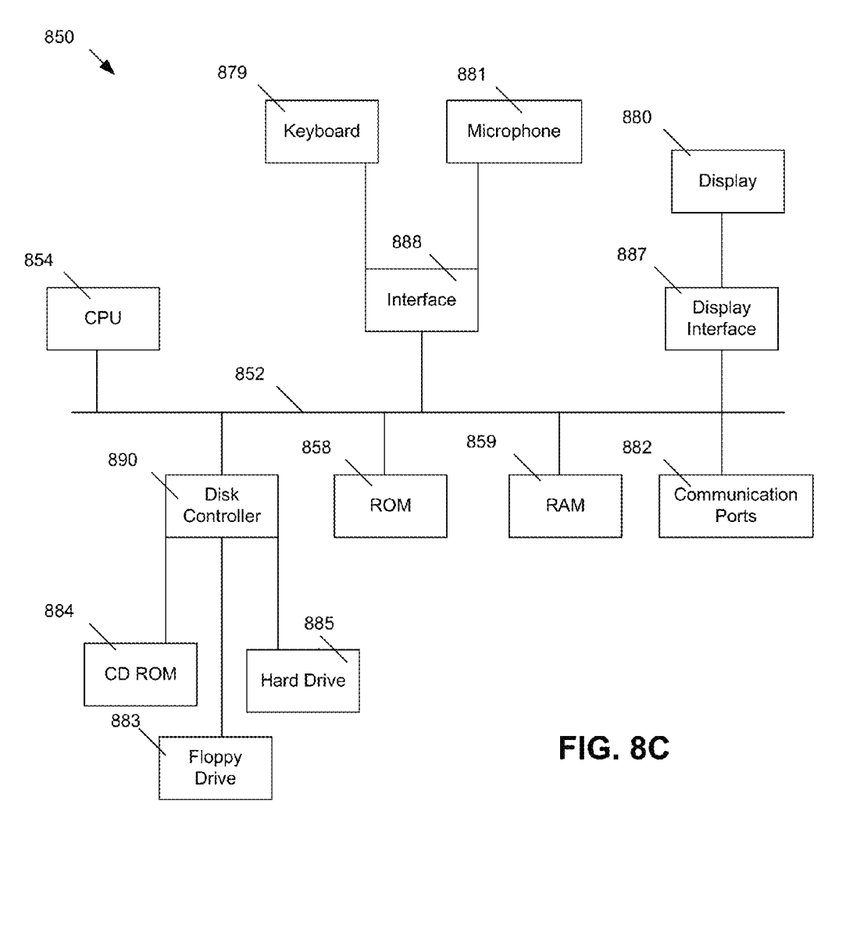

FIGS. 8A, 8B, and 8C depict example systems for implementing the approaches described herein for generating a user interface display on a graphical user interface. For example, FIG. 8A depicts an exemplary system 800 that includes a standalone computer architecture where a processing system 802 (e.g., one or more computer processors located in a given computer or in multiple computers that may be separate and distinct from one another) includes a user interface management module 804 being executed on the processing system 802. The processing system 802 has access to a computer-readable memory 807 in addition to one or more data stores 808. The one or more data stores 808 may include native data 810 as well as containment hierarchy data 812. The processing system 802 may be a distributed parallel computing environment, which may be used to handle very large-scale data sets.

FIG. 8B depicts a system 820 that includes a client-server architecture. One or more user PCs 822 access one or more servers 824 running a user interface management module 837 on a processing system 827 via one or more networks 828. The one or more servers 824 may access a computer-readable memory 830 as well as one or more data stores 832. The one or more data stores 832 may include native data 834 as well as containment hierarchy data 838.

FIG. 8C shows a block diagram of exemplary hardware for a standalone computer architecture 850, such as the architecture depicted in FIG. 8A that may be used to include and/or implement the program instructions of system embodiments of the present disclosure. A bus 852 may serve as the information highway interconnecting the other illustrated components of the hardware. A processing system 854 labeled CPU (central processing unit) (e.g., one or more computer processors at a given computer or at multiple computers), may perform calculations and logic operations required to execute a program. A non-transitory processor-readable storage medium, such as read only memory (ROM) 858 and random access memory (RAM) 859, may be in communication with the processing system 854 and may include one or more programming instructions for performing the method of generating a user interface display on a graphical user interface. Optionally, program instructions may be stored on a non-transitory computer-readable storage medium such as a magnetic disk, optical disk, recordable memory device, flash memory, or other physical storage medium.

In FIGS. 8A, 8B, and 8C, computer readable memories 807, 830, 858, 859 or data stores 808, 832, 883, 884, 888 may include one or more data structures for storing and associating various data used in the example systems for generating a user interface display on a graphical user interface. For example, a data structure stored in any of the aforementioned locations may be used to store data from XML files, initial parameters, and/or data for other variables described herein. A disk controller 890 interfaces one or more optional disk drives to the system bus 852. These disk drives may be external or internal floppy disk drives such as 883, external or internal CD-ROM, CD-R, CD-RW or DVD drives such as 884, or external or internal hard drives 885. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 890, the ROM 858 and/or the RAM 859. The processor 854 may access one or more components as required.

A display interface 887 may permit information from the bus 852 to be displayed on a display 880 in audio, graphic, or alphanumeric format. Communication with external devices may optionally occur using various communication ports 882.

In addition to these computer-type components, the hardware may also include data input devices, such as a keyboard 879, or other input device 881, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

It is claimed:

1. A computer-implemented method of generating a user interface display on a graphical user interface, the method comprising:
    accessing native data from memory for generating a containment hierarchy, the native data describing features of the user interface display;
    generating the containment hierarchy using the accessed native data, the containment hierarchy comprising a plurality of content records, wherein the containment hierarchy is stored in a system heap;
    generating the user interface display by iterating through the plurality of content records of the containment hierarchy;
    removing one or more references to one or more content records of the plurality of content records of the containment hierarchy, wherein the one or more references indicate that the corresponding one or more content records are in use, such that the one or more content records can be reclaimed by garbage collection;
    receiving a command to access a first content record of the plurality of content records of the containment hierarchy, wherein the first content record has been reclaimed by garbage collection;
    accessing native data from memory for regenerating the first content record that has been reclaimed by garbage collection, wherein the graphical user interface is updated using the regenerated content record.

2. The method of claim 1, wherein garbage collecting the first content record frees memory associated with the first content record and reduces a number of objects tracked in the system heap.

3. The method of claim 1, wherein the native data is stored in one or more typed data structures.

4. The method of claim 1, wherein the plurality of content records of the containment hierarchy are stored in untyped data structures.

5. The method of claim 4, wherein a content record of the plurality of content records of the containment hierarchy includes a data type field and an in-use field.

6. The method of claim 1, wherein the containment hierarchy comprises a tree of content records.

7. The method of claim 1, wherein the plurality of content records is used to generate content entities on the graphical user interface.

8. The method of claim 7, wherem the content entities include one or more of controls, lists, and media.

9. The method of claim 1, wherein the plurality of content objects of the containment hierarchy is associated with content entities that span more area than the graphical user interface can display at one time;
    wherein removing references comprises removing references for content entities that are not currently displayed on the graphical user interface.

10. The method of claim 9, wherein the graphical user interface displays a list of cells, wherein the containment hierarchy includes a content record for each cell of the list, wherein the graphical user interface displays a certain portion of the list at a time;
    wherein removing references comprises removing references of content objects for cells not currently displayed on the graphical user interface.

11. The method of claim 1, wherein the plurality of content records of the containment hierarchy is sealed such that applications cannot add or delete properties.

12. The method of claim 1, wherein the user interface display is generated using a dynamic language.

13. The method of claim 12, wherein the dynamic language is JavaScript.

14. A computer-implemented system for generating a user interface display on a graphical user interface, comprising:
    a processor;
    a non-transitory computer-readable medium encoded with instructions, which when executed by the processor, causes the system to:
        access native data from memory for generating a containment hierarchy, the native data describing features of the user interface display;
        generate the containment hierarchy using the accessed native data, the containment hierarchy comprising a plurality of content records, wherein the containment hierarchy is stored in a system heap;
        generate the user interface display by iterating through the plurality of content records of the containment hierarchy;

remove one or more references to one or more content records of the plurality of content records of the containment hierarchy, wherein the one or more references indicate that the corresponding one or more content records are in use, such that the one or more content records can he reclaimed by garbage collection;

receive a command to access a first content record of the plurality of content records of the containment hierarchy, wherein the first content record has been reclaimed by garbage collection;

access native data from memory for regenerating the first content record that has been reclaimed by garbage collection, wherein the graphical user interface is updated using the regenerated content record.

15. The system of claim 14, wherein garbage collecting the first content record frees memory associated with the first content record and reduces a number of objects tracked in the system heap.

16. The system of claim 14, wherein the native data is stored in one or more typed data structures.

17. The system of claim 14, wherein the plurality of content records of the containment hierarchy are stored in untyped data structures.

18. The system of claim 17, wherein a content record of the plurality of content records of the containment hierarchy includes a data type field and an in-use field.

19. The system of claim 14, wherein the containment hierarchy comprises a tree of content records.

20. A non-transitory computer-readable medium encoded with instructions, which when executed by a processor of a system, causes the system to perform operations for generating a user interface display on a graphical user interface, the operations comprising:

accessing native data from memory for generating a containment hierarchy, the native data describing features of the user interface display;

generating the containment hierarchy using the accessed native data, the containment hierarchy comprising a plurality of content records, wherein the containment hierarchy is stored in a system heap;

generating the user interface display by iterating through the plurality of content records of the containment hierarchy;

removing one or more references to one or more content records of the plurality of content records of the containment hierarchy, wherein the one or more references indicate that the corresponding one or more content records are in use, such that the one or more content records can be reclaimed by garbage collection;

receiving a command to access a first content record of the plurality of content records of the containment hierarchy, wherein the first content record has been reclaimed by garbage collection;

accessing native data from memory for regenerating the first content record that has been reclaimed by garbage collection, wherein the graphical user interface is updated using the regenerated content record.

* * * * *